Aug. 15, 1933.　　　T. R. RHEA　　　1,922,864
COMPASS
Filed April 19, 1929

Inventor:
Thomas R. Rhea,
by Charles E. Tullor
His Attorney.

Patented Aug. 15, 1933

1,922,864

UNITED STATES PATENT OFFICE 1,922,864

COMPASS

Thomas R. Rhea, Schenectady, N. Y., assignor to General Electric Company, a Corporation of New York Application April 19, 1929. Serial No. 356,532

5 Claims. (Cl. 33—225)

This invention relates to magnetic compasses and more particularly to magnetic compasses of the moving card type in use upon ships and airplanes.

It is well known that the presence of a stray magnetic field in the vicinity of the needle of a compass such as to produce a distortion of the earth's field thereby causes the needle to deviate from the position that it would normally occupy in the earth's field and thus give an erroneous indication to an observer. The distortion of the earth's field may be due, for example, to the presence of a permanent magnet, an electromagnet, etc., in the vicinity of the compass.

Accordingly, an object of my invention is the provision of a simple, reliable, and effective means for compensating and correcting for the effect of distortion of the earth's field in the vicinity of a magnetic compass; more particularly the provision of means for compensating for distortion of the earth's field by an auxiliary field.

Although my invention is applicable to magnetic compasses in general, I have illustrated it as embodied in a magnetic compass the structure of which is peculiarly adapted for use on airplanes.

In carrying my invention into effect in one form thereof, I provide a pair of small compensating or corrective magnets within the housing of the compass; one pole of one magnet being placed adjacent a like pole of the other magnet with the magnetic axes of both magnets in alignment and I further provide means for simultaneously altering the position of both magnets within the housing.

Figure 1:
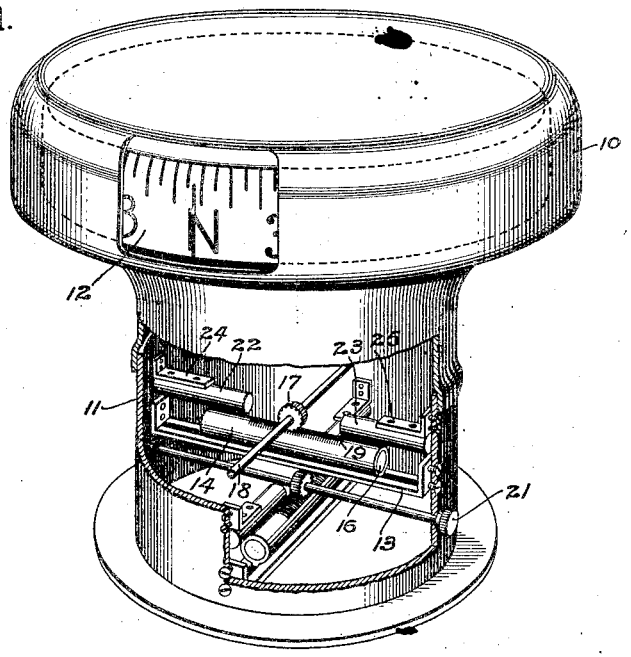
Figure 1:
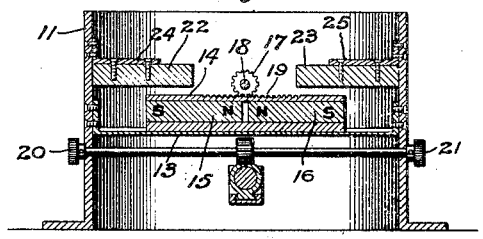
Figure 1:
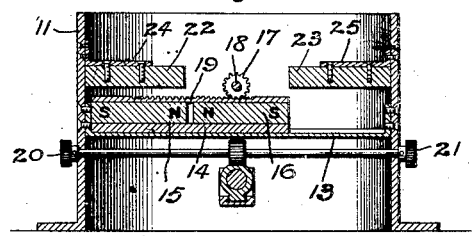

For a better understanding of the invention, reference should now be made to the following specification and to the accompanying drawing, in which Fig. 1 is a perspective view of a magnetic compass of the type above described with a portion of the housing broken away to reveal the compensating elements comprising my invention.

Figs. 2 and 3 are sectional views of the lower part of the housing or compensating chamber and the compensating mechanism included therein.

Referring now to the drawing, a compass box 10 in the form of an inverted cup is telescoped over the upper edge of a housing member 11 constructed of some non-magnetic material such as brass which, as shown in the drawing, is formed to provide a compensating chamber beneath the compass box. A compass card 12 is provided with the customary markings and graduations, and the compass box is cut away to provide a window through which the card markings are made visible to the eye of the observer. Since the particular type of needle and mounting for the needle forms no part of my invention and since an understanding of these elements is not necessary to an understanding of the invention, they have been omitted from the drawing.

To overcome the error due to the effect of the permanently magnetized bodies in the neighborhood of a compass needle, two corrective units are provided interiorly of the circular housing 11 of the compensating chamber. As is most clearly shown in Fig. 1, these two compensating units are mounted to occupy respective vertical planes at right angles with each other for the purpose of providing fore and aft and athwart-ship compensation. Since the elements comprised in each of the above mentioned compensating units are identical, only one of the units will be described in detail.

A guideway 13 is provided with bent-up ends which are secured to the housing 11 by any suitable fastening devices such as the screws shown in the drawing. The guideway 13 is provided with a longitudinal groove of dove tail cross section to receive the dove tail tongue of a cylindrical housing member or carriage 14. Two corrective magnets 15 and 16, respectively, are mounted within the housing 14 with poles of like polarity adjacent each other and with their magnetic axes in substantial alignment. It will thus be seen that the guideway 13 serves as a supporting means for the tubular housing 14 and the corrective magnets 15 and 16 located therein. Although the two magnets have been shown in the drawing with north poles adjacent each other, this is not at all necessary to the invention since the device will function equally well with the south poles adjacent each other. The guideway 13 and the housing 14 are formed of a non-magnetic material such, for example, as brass.

Provision is made for displacing the housing 14 and the magnets 15 and 16 therein contained, longitudinally of the guideway in the form of a small pinion 17 mounted upon a shaft 18, and a rack 19 upon the housing 14 with which the pinion engages. The shaft 18 extends diametrically across the compensating chamber and through the walls 11 thereof. Thumb nuts such as the thumb nuts 20 and 21 on the shaft of the lower compensating unit are secured to the extremities of the shaft 18 to effect rotation of the shaft by turning of the nuts.

The corrective effect of the compensating magnets 15 and 16 is strengthened or intensified by magnetic members 22 and 23 which, as shown in the drawing, are secured to the housing 11 by brackets 24 and 25, respectively. These magnetic members are cylindrical in form and each is approximately the size of one of the compensating magnets 15, 16. Although these magnetic members may be formed of any suitable magnetic material, I choose to construct them of soft iron.

With the above preliminary understanding of the elements comprising my invention and their association with each other, the manner in which these units are operated to correct errors due to permanently magnetized bodies in the vicinity of the compass will now be described.

As is well known by persons skilled in this art, the presence of a magnet, such as a permanently magnetized body in the vicinity of the compass will set up a stray magnetic field and when this stray field makes an angle with the axis of the earth's field, it may be resolved into two components, one parallel to the axis of the earth's field, and one at right angles thereto. When the ship or airplane upon which the compass is mounted is pointed north, the component of the stray field which is at right angles with the earth's field is east and west, and this component will cause the north line on the compass card to deviate slightly from the axis of the earth's field either to the right or to the left, depending upon whether the component at right angles with the earth's field is in the east direction or in the west direction. This component, however, may be balanced out by turning either of the nuts 20 or 21 to displace the compensating magnets 15, 16 from their neutral position shown in Fig. 2. When the north marking on the compass card registers with the indices on the compass window with the ship pointing due north, the component at right angles to the field will have been fully compensated.

When the ship is turned east and west, the component of the stray field which was parallel to the axis of the earth's field when the ship pointed north will now be at right angles with the earth's field and, therefore, the compensating unit at right angles with the one just described must be manipulated as above to correct for this component of the stray field.

The manner in which displacement of the two compensating magnets 15 and 16 along the guideway 14 introduces a corrective component will now be explained. When the two magnets are in the central position shown in Fig. 2, their effect balances each other and no corrective component is introduced. Displacement of the carriage 14 along the guideway 13 as in Fig. 3 brings the magnet 15 into position beneath magnetic member 22 and brings magnet 16 into a position below the space which intervenes between the magnetic members 22 and 23. Thus magnet 15 is effectually screened by the magnetic member 22 whilst the effect produced by magnetic member 23 upon magnet 16 is to lengthen that magnet which, as will be understood by persons skilled in this art, tends to increase or intensify the corrective effect which that magnet will have.

Had the magnets been displaced to the opposite end of the guideway, magnet 16 would become screened by magnetic member 23 and magnet 15 would introduce a compensating component in a direction the reverse of that above described for magnet 16.

Thus it will be seen that my invention provides a simple and extremely effective means for making fore and aft and athwart-ship compensations for the error arising due to the presence of permanent magnetism in the vicinity of a magnetic card compass.

Although in accordance with the provisions of the patent statutes I have described my invention as comprising particular elements associated with each other in a specific manner, I would have it distinctly understood that the invention is not limited to the exact form or apparatus shown in the drawing for the purposes of illustration, since alterations and modifications will readily suggest themselves to persons skilled in the art without departing from the spirit of my invention or from the scope of the annexed claims.

What I claim as new and desire to secure by Letters Patent of the United States, is:

1. In a compass, a supporting guideway, a carriage slidably mounted upon said guideway, a pair of corrective magnets secured to said carriage with their magnetic axes in substantial alignment and with a pole of one of said magnets adjacent a pole of like polarity of the other of said magnets, and manually operated means for displacing said carriage along said guideway.

2. Compensating means for a compass or the like comprising a housing member, a supporting guideway attached to said member, a carriage slidably mounted upon said guideway, a pair of compensating magnets and a pair of ferro-magnetic members for intensifying the compensating effect of said pair of magnets, one of said pairs being mounted in said carriage and the other of said pairs being mounted upon said housing member, and manually operable means for effecting relative movement between said pairs of magnets and said pair of ferro-magnetic members.

3. In a compass or the like, compensating means comprising a supporting guideway, a carriage slidably mounted on said guideway, a compensating unit comprising two magnets so mounted in said carriage that two poles of like polarity are in juxtaposition with each other and the magnetic axes of said magnets are in substantial alignment, a pair of magnetic members for intensifying the corrective effect of said compensating magnets, said magnetic members being attached to said housing and so positioned that their longitudinal axis and the longitudinal axis of the said magnets lie in substantially the same vertical plane, and in different horizontal planes.

4. In a compass, a housing member, a pair of compensating units mounted on said housing and interiorly thereof, said units occupying vertical planes at right angles to each other, and each comprising a supporting guideway, a hollow carriage movably mounted on said guideway and a pair of corrective magnets mounted in said carriage in magnetic alignment with a pole of one magnet adjacent a like pole of the other magnet, and respective manually operable means for displacing each of said carriages along said guideways.

5. In a compass, a housing member, a pair of compensating units mounted on said housing and interiorly thereof, said units occupying vertical planes at right angles to each other, and each comprising a supporting guideway, a tubular carriage member slidably mounted on said guideway and a pair of corrective magnets mounted therein with their magnetic axes in substantial alignment and a pole of one adjacent a like pole of the other, a pair of magnetic members mounted interiorly of said housing with their longitudinal axes in the same vertical plane with the magnetic axis of said magnets for intensifying the corrective effect of said magnets, and respective manually operable means for displacing each of said carriages along said guideways.

THOMAS R. RHEA.